(12) United States Patent  
Taylor et al.

(10) Patent No.: US 8,639,393 B2  
(45) Date of Patent: Jan. 28, 2014

(54) SYSTEM FOR AUTOMATED EXCAVATION PLANNING AND CONTROL

(75) Inventors: Michael A. Taylor, Pittsburgh, PA (US); Jean-Jacques Clar, Edelstein, IL (US); Thandava K. Edara, Peoria, IL (US); Timothy J. Felty, East Peoria, IL (US); Troy K. Becicka, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 13/198,334

(22) Filed: Aug. 4, 2011

(65) Prior Publication Data

US 2012/0136508 A1     May 31, 2012

Related U.S. Application Data

(60) Provisional application No. 61/418,330, filed on Nov. 30, 2010.

(51) Int. Cl.
*G05D 1/00*     (2006.01)
*G06F 7/00*     (2006.01)

(52) U.S. Cl.
USPC ............ 701/2; 701/23; 701/25; 701/31.4

(58) Field of Classification Search
CPC .................. G05D 1/00; G06F 7/00
USPC ................. 701/50, 2, 23, 25, 31.4
See application file for complete search history.

(56) References Cited

U.S. PATENT DOCUMENTS

| | | | |
|---|---|---|---|
| 4,600,999 A | 7/1986 | Ito et al. | |
| 4,986,384 A | 1/1991 | Okamoto et al. | |
| 5,005,652 A | 4/1991 | Johnson | |
| 5,196,900 A * | 3/1993 | Pettersen | 356/141.4 |
| 5,375,663 A | 12/1994 | Teach | |
| 5,477,459 A * | 12/1995 | Clegg et al. | 701/300 |

(Continued)

FOREIGN PATENT DOCUMENTS

| | | |
|---|---|---|
| EP | 1571515 | 9/2005 |
| GB | 2448972 | 11/2008 |

OTHER PUBLICATIONS

U.S. Patent Application of Bryan J. Everett et al. entitled "Machine Control System Having Autonomous Dump Queuing" filed Aug. 4, 2011.

(Continued)

*Primary Examiner* — Tuan C. To
(74) *Attorney, Agent, or Firm* — Finnegan, Henderson, Farabow, Garrett & Dunner LLP

(57) ABSTRACT

A control system is disclosed for a mobile excavation machine operating at a worksite. The control system may have a locating device configured to generate a first signal indicative of a position of the mobile excavation machine, and a position sensor configured to generate a second signal indicative of a position of a work tool. The control system may also have an offboard planner configured to receive a first input indicative of a characteristic of an intended work area, a second input indicative of a characteristic of the mobile excavation machine, and a third input indicative of a desired change in the intended work area. The offboard planner may also be configured to generate an excavation plan based on the first, second, and third inputs. The control system may further have a controller configured to autonomously control the mobile excavation machine based on the first and second signals and based on the excavation plan.

52 Claims, 3 Drawing Sheets

(56) References Cited

U.S. PATENT DOCUMENTS

| | | | |
|---|---|---|---|
| 5,586,030 A | | 12/1996 | Kemner et al. |
| 5,610,821 A | * | 3/1997 | Gazis et al. ................ 455/456.5 |
| 5,629,855 A | * | 5/1997 | Kyrtsos et al. ................ 701/300 |
| 5,735,065 A | * | 4/1998 | Yamagata et al. ............. 37/348 |
| 5,854,988 A | * | 12/1998 | Davidson et al. .............. 701/50 |
| 5,913,914 A | | 6/1999 | Kemner et al. |
| 5,925,081 A | | 7/1999 | Hawkins et al. |
| 5,931,875 A | | 8/1999 | Kemner et al. |
| 5,961,560 A | | 10/1999 | Kemner |
| 6,128,574 A | | 10/2000 | Diekhans |
| 6,236,924 B1 | | 5/2001 | Motz et al. |
| 6,246,932 B1 | | 6/2001 | Kageyama et al. |
| 6,532,409 B1 | * | 3/2003 | Fujishima et al. ............. 701/50 |
| 6,729,050 B2 | * | 5/2004 | Whitten et al. .................. 37/96 |
| 6,782,644 B2 | * | 8/2004 | Fujishima et al. ............. 37/348 |
| 6,836,982 B1 | | 1/2005 | Augustine |
| 7,516,563 B2 | * | 4/2009 | Koch ............................. 37/348 |
| 8,014,924 B2 | * | 9/2011 | Greiner et al. ................. 701/50 |
| 8,364,189 B2 | * | 1/2013 | Mintah et al. ................ 455/518 |
| 2002/0143461 A1 | | 10/2002 | Burns et al. |
| 2004/0068352 A1 | | 4/2004 | Anderson |
| 2004/0158355 A1 | | 8/2004 | Holmqvist et al. |
| 2006/0069472 A1 | | 3/2006 | Makela |
| 2006/0149465 A1 | | 7/2006 | Park et al. |
| 2008/0133128 A1 | | 6/2008 | Koch |
| 2009/0096637 A1 | * | 4/2009 | Olson et al. ................... 340/993 |
| 2010/0076640 A1 | | 3/2010 | Maekawa et al. |
| 2010/0131122 A1 | * | 5/2010 | Dersjo et al. ..................... 701/2 |
| 2011/0131373 A1 | * | 6/2011 | Kumar et al. ................. 711/113 |
| 2011/0153117 A1 | * | 6/2011 | Koch et al. ....................... 701/2 |

OTHER PUBLICATIONS

U.S. Patent Application of Bryan J. Everett et al. entitled "System for Machine Control System Having Autonomous Resource Queuing" filed Aug. 4, 2011.

U.S. Patent Application of Bryan J. Everett et al. entitled "Control System Having Tool Tracking" filed Aug. 4, 2011.

U.S. Patent Application of Bryan J. Everett et al. entitled "System for Autonomous Path Planning and Machine Control" filed Aug. 4, 2011.

* cited by examiner

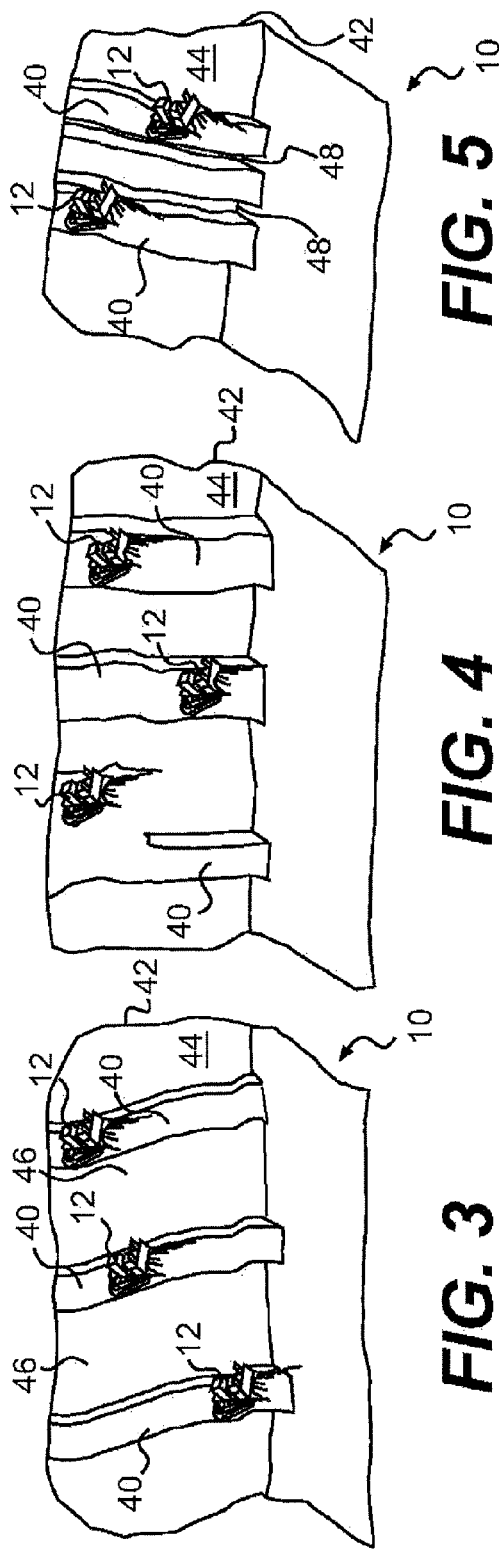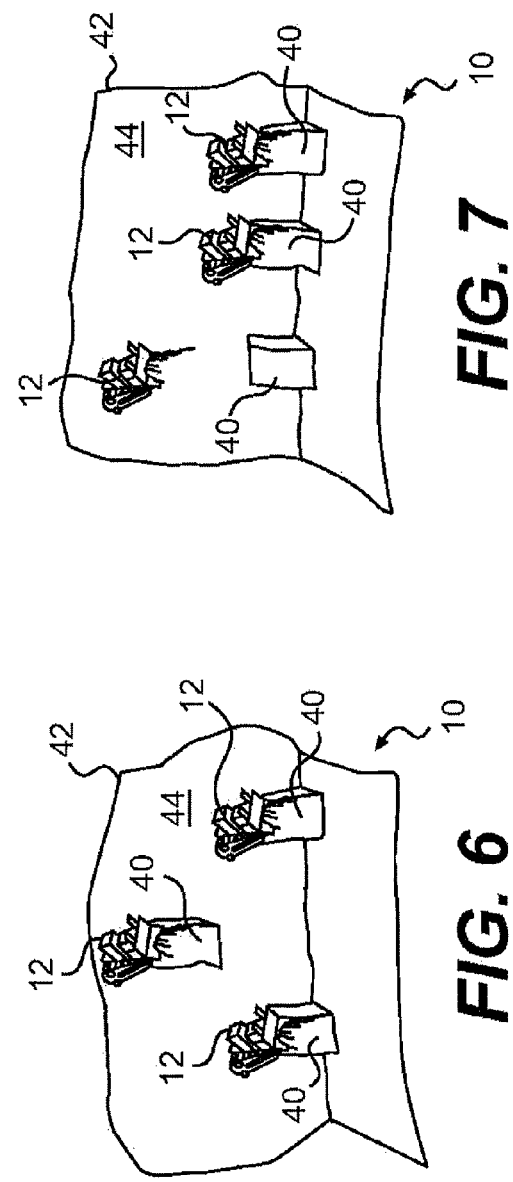

SYSTEM FOR AUTOMATED EXCAVATION PLANNING AND CONTROL

RELATED APPLICATIONS

This application is based on and claims the benefit of priority from U.S. Provisional Application No. 61/418,330 by Michael A. TAYLOR, Jean-Jacques CLAR, Thandava K. EDARA, Timothy J. FETTY, and Troy K. BECICKA, filed Nov. 30, 2010, the contents of which are expressly incorporated herein by reference.

TECHNICAL FIELD

The present disclosure relates generally to control system and, more particularly, to a system for automatically planning excavation at a worksite and responsively controlling a machine to complete the excavation.

BACKGROUND

Machines such as, for example, dozers, motor graders, wheel loaders, and other types of heavy equipment are used to perform a variety of tasks. Some of these tasks require very precise and accurate control over operation of the machine that are difficult for an operator to provide. Other tasks requiring removal of large amounts of material can be difficult for an unskilled operator to achieve efficiently. Because of these factors, the completion of some tasks by a completely operator-controlled machine can be expensive, labor intensive, time consuming, and inefficient.

One method of improving the operation of a machine under such conditions is described in U.S. Pat. No. 5,375,663 (the '663 patent) issued to Teach on Dec. 27, 1994. The '663 patent describes an earthmoving apparatus and method for grading a tract of land to a desired finish contour. The earthmoving apparatus has a blade of known width for cutting and filling soil. Vertical blade movement and the x and y position of the earthmoving apparatus are continually detected by sensors as the earthmoving apparatus traverses the tract of land. An ultrasonic transmitter and receiver detects elevation of the soil to provide updated soil elevation information. A computer uses this information to generate a contour map of the tract of land with fill and cut lines thereon that will produce the desired finish contour. The computer continuously modifies the contour map to reflect changes in the topography of the tract of land as the earthmoving apparatus proceeds with the grading process. In addition, the computer generates an elevation error based on the contour map and a detected position of the blade. The computer then automatically adjusts elevation of the blade to reduce the elevation error.

Although the computer of the '663 patent may help control an earthmoving apparatus during final grading, it may be less that optimal during bulk material operations that require multiple passes to remove a desired amount of material in a particular manner. In addition, the computer of the '663 patent may not be configured to coordinate simultaneous operations of multiple machines.

The disclosed system is directed to overcoming one or more of the problems set forth above.

SUMMARY

In one aspect, the present disclosure is directed to a control system for a mobile excavation machine operating at a worksite. The control system may include a locating device mounted on the mobile excavation machine and configured to generate a first signal indicative of a position of the mobile excavation machine at the worksite, and a position sensor associated with a work tool of the mobile excavation machine and configured to generate a second signal indicative of a position of the work tool relative to a known location on the mobile excavation machine. The control system may also include an offboard planner configured to receive a first input indicative of a characteristic of an intended work area, receive a second input indicative of a characteristic of the mobile excavation machine, and receive a third input indicative of a desired change in the intended work area. The offboard planner may be further configured to generate an excavation plan for the intended work area based on the first, second, and third inputs. The control system may also include a controller in communication with the locating device, the position sensor, and the offboard planner. The controller may be configured to autonomously control the mobile excavation machine based on the first and second signals and based on the excavation plan.

In yet another aspect, the present disclosure is directed to a computer readable medium having computer executable instructions for performing a method of machine control. The method may include determining a first position of the mobile machine at a worksite, and determining a second position of a work tool relative to the mobile machine. The method may also include receiving a first input indicative of a characteristic of an intended work area, receiving a second input indicative of a characteristic of the mobile machine, and receiving a third input indicative of a desired change in the intended work area. The method may additionally include generating an excavation plan for the intended work area based on the first, second, and third inputs, and autonomously controlling the mobile machine based on the first and second positions and based on the excavation plan.

BRIEF DESCRIPTION OF THE DRAWINGS

FIGS. 3-7 are pictorial illustrations of exemplary disclosed operations performed by the control system of FIG. 2.

DETAILED DESCRIPTION

Figure 1:
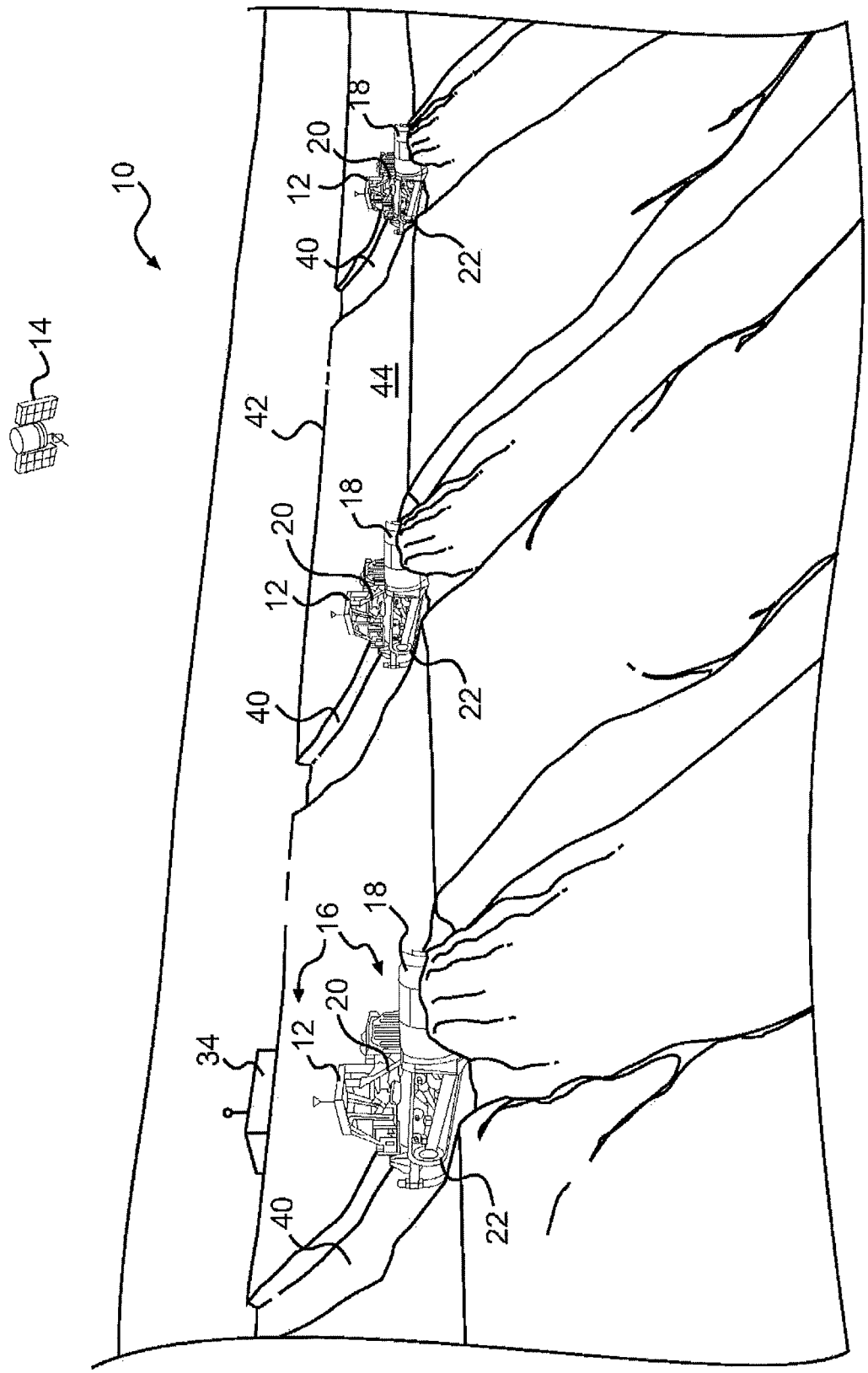
FIG. 1 is a pictorial illustration of an exemplary disclosed worksite.

FIG. 1 illustrates a worksite 10 with one or more exemplary machines 12 performing a predetermined task. Worksite 10 may include, for example, a mine site, a landfill, a quarry, a construction site, or any other type of worksite known in the art. The predetermined task may be associated with altering the current geography at worksite 10. For example, the predetermined tasks may include a dozing operation, grading operation, a leveling operation, a bulk material removal operation, or any other type of operation that results in alteration of the current geography at worksite 10. As machine 12 moves about worksite 10, a satellite 14 or other tracking device may communicate with a control system 16 to monitor the movement of machine 12.

Machine 12 may embody a mobile machine that performs some type of operation associated with an industry such as mining, construction, farming, or any other industry known in the art. For example, machine 12 may embody an earth moving machine such as a dozer having a blade or other work tool 18 movable by way of one or more motors or actuators 20. Machine 12 may also include one more traction devices 22, which may function to steer and/or propel machine 12.

Figure 2:
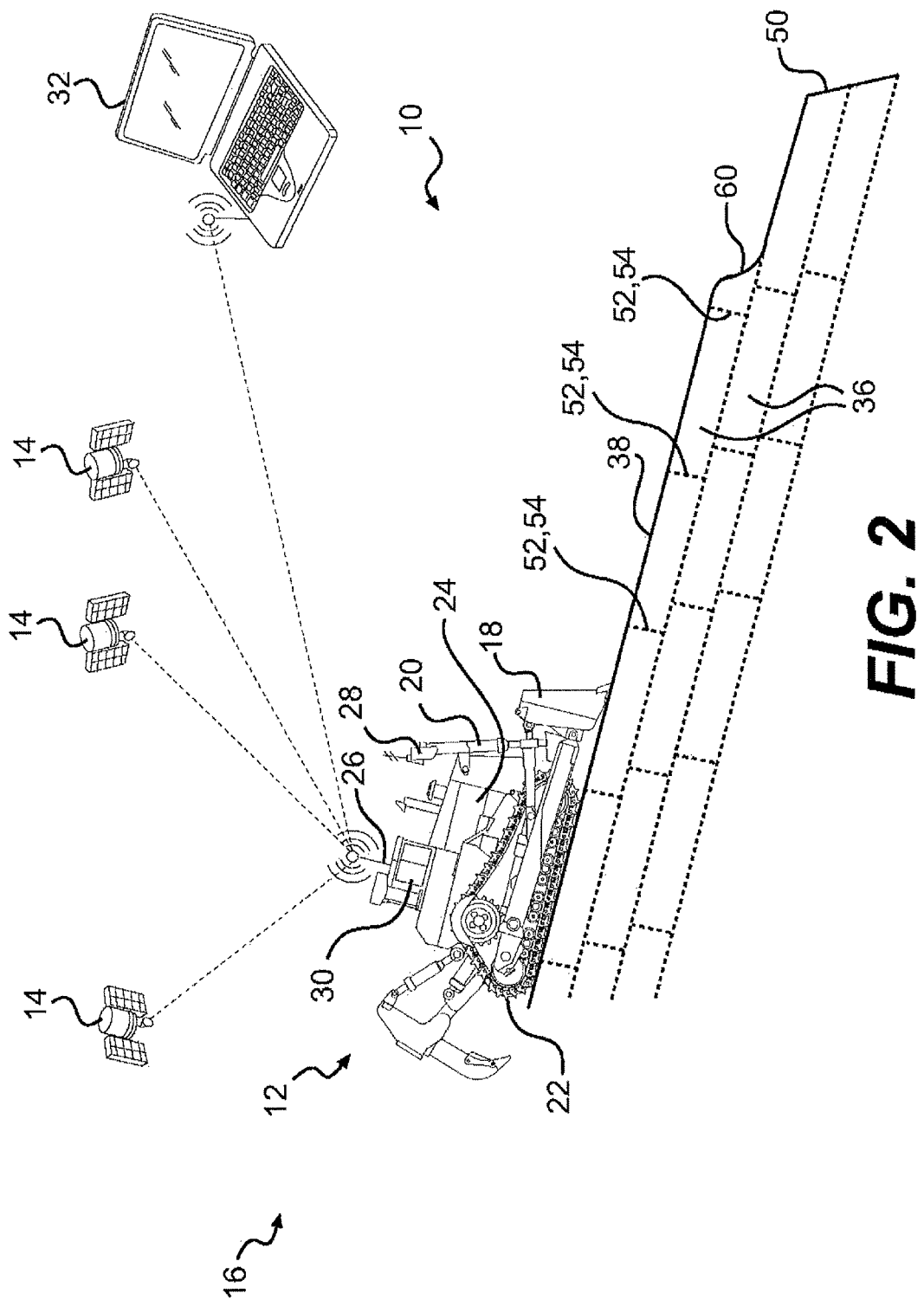
FIG. 2 is a pictorial illustration of an exemplary disclosed control system for use at the worksite of FIG. 1.

As illustrated in FIG. 2, control system 16 may include onboard components that interact to affect operation of machine 12 in response to positional information received from satellite 14. In particular, control system 16 may include a power source 24 used to power actuators 20 and traction device 22, a locating device 26, a tool position sensor 28, and a controller 30. Controller 30 may be in communication with power source 24, actuators 20, traction device 22, locating device 26, and position sensor 28 via multiple different communication links (not shown) to autonomously control operations of machine 12.

Power source 24 may include an engine such as, for example, a diesel engine, a gasoline engine, a gaseous fuel powered engine such as a natural gas engine, or any other type of engine apparent to one skilled in the art. Power source 24 may alternatively include a non-combustion source of power such as a fuel cell, a power storage device, an electric motor, or other similar mechanism. Power source 24 may be connected to traction devices 22 and/or actuators 20 via a direct mechanical coupling, an electric circuit, a hydraulic circuit, or in any other suitable manner.

Locating device 26 may embody an electronic receiver configured to communicate with satellites 14 to determine a location of itself relative to satellites 14. In particular, locating device 26 may receive and analyze high-frequency, low power radio signals from multiple satellites 14 to triangulate a 3-D position relative to the different satellites 14. A signal indicative of this position may then be communicated from locating device 26 to controller 30. Alternatively, locating device 26 may embody an Inertial Reference Unit (IRU), a component of a local tracking system, or any other known locating device that receives or determines positional information associated with machine 12.

Position sensor 28 may embody any type of sensor configured to detect a position of a work tool 18 relative to a known position on machine 12 (e.g., relative to locating device 26), and generate a corresponding signal. In one example, position sensor 28 may be an acoustic, magnetic, or optical type sensor associated with actuators 20 and/or linkage that move work tool 18. In another example, position sensor 28 may be a local and/or global positioning sensor configured to communicate with offboard devices (e.g., local laser systems, radar systems, satellites, etc.) to directly determine local and/or global coordinates of work tool 18. It should be noted that any number and type of position sensors 28 may be included and positioned at any location on or near work tool 18. Based on signals generated by position sensor(s) 28 and based on known kinematics of machines 12, each controller 30 may be configured to determine in real time a location of the associated work tool 18 relative to the known position of machine 12 and communicate the location to controller 30 for further processing.

Controller 30 may include means for monitoring, recording, storing, indexing, processing, and/or communicating the location of machine 12 and position of work tool 18, and for automatically controlling operations of machine 12 based on an excavation plan provided by an offboard planner 32. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 30 may further include a means for communicating with offboard planner 32. For example, controller 30 may include hardware and/or software that enables sending and receiving of data messages through a direct data link (not shown) or a wireless communication link (not shown). The wireless communications may include satellite, cellular, infrared, and any other type of wireless communications that enable controller 30 to exchange information. It is contemplated that a separate module may alternatively be included within control system 16 to facilitate the communication of data between controller 30 and offboard planner 32, if desired.

Offboard planner 32 may represent one or more receiving, computing, and/or display systems of a business entity 34 (referring to FIG. 1) associated with machine 12, such as a manufacturer, dealer, retailer, owner, service provider, or any other entity that generates, maintains, sends, and/or receives information associated with machine 12. The one or more computing systems may include, for example, a machine simulator, a mainframe, a work station, a laptop, a personal digital assistant, and other computing systems known in the art.

Offboard planner 32, based on various user input and location information from locating device 26 and position sensor 28, may be configured to execute instructions stored on computer readable medium to perform methods of excavation planning and control for machines 12. The excavation planning method may include, among other things, determining a location, size, and shape of a plurality of cuts 36 into an intended work surface 38 at worksite 10; grouping cuts 36 into a plurality of spaced apart locations known as slots 40 (referring to FIGS. 1 and 3-7), including determining a spacing between, a size of, and a trajectory of slots 40; determining a sequence of particular cuts 36 that should be excavated in order; determining a number of passes through each sequence required to accomplish an excavation phase; and determining a number of phases required to complete the excavation plan. The user input may include, for example, characteristics of an available and intended excavation area 44 at worksite 10 such as current boundaries 42 (referring to FIGS. 1 and 3-7) and a site profile (i.e., initial contour, slope, coordinates, etc.). The user input may also include a desired goal regarding excavation of area 44 such as an amount of material moved and/or a final contour of area 44.

Based on the characteristics of the available excavation area 44 at worksite 10 and the desired goal received from the user of control system 16, offboard planner 32 may be configured to divide area 44 into a number of spaced apart slots 40, each slot containing multiple cuts 36. The dimensions of slots 40 (e.g., width) may be determined by offboard planner 32 based on machine characteristics such as work tool width, user defined spacing between slots, and machine output or capacity such as torque and speed. It is contemplated that the dimensions of slots 40 may also or alternatively be determined by offboard planner 32 based on site conditions such as material composition, grade, etc. Offboard planner 32 may utilize a simple coverage algorithm to lay out slots 40 on work area 44, with the ends of slots 40 terminating at boundary 42 and slots 40 having a fixed spacing therebetween.

The layout of slots on work area 44 by offboard planner 32 may also be affected by a desired dozing behavior of machines 12 that is selected by the user of control system 16. FIGS. 3-7 illustrate five different dozing behaviors that are selectable by the user from a list of available behaviors programmed into a memory of offboard planner 32. It should be noted that additional and/or different behaviors may be selected for use, if desired.

The first dozing behavior, illustrated in FIG. 3, may include the pushing of material through adjacent slots 40 that are spaced apart from each other by a significant distance. Each machine 12 may be controlled to perform a sequence of multiple cuts 36 in order along the length of an assigned slot 40 until a desired depth of the entire slot 40 is achieved. In some embodiments, several excavation passes may be required to achieve the desired depth. Once the desired depth along the length of one slot 40 is achieved, machine 12 may be directed by controller 30 to move to another slot location and commence excavation. After excavation of all slots 40 to the desired depth is achieved, one phase of the excavation plan may be complete. Another phase of the same excavation plan may then require machine 12 to repeat the process to a new and lower depth. When all phases of excavation for the first behavior are complete, a sizable berm 46 may be left between slots 40.

The second dozing behavior, illustrated in FIG. 5, may include the pushing of material through slots 40 that at least partially overlap with successive slots 40. Specifically, each machine 12 may be controlled to perform a sequence of multiple cuts 36 in order along the length of an assigned slot 40 for a single excavation pass. After one excavation pass along the length of one slot 40 is achieved, machine 12 may be directed by controller 30 to move in a direction transverse to the completed slot 40 (i.e., to move sideways) by a distance about equal to one half of the width of work tool 18 to start a new slot 40. In this manner, no berms may be left between slots 40. Once an entire layer of area 44 has been excavated in this manner, the corresponding phase may be considered to be complete.

The third dozing behavior, illustrated in FIG. 5, may include the pushing of material through adjacent slots 40 that are spaced apart from each other by a relatively small distance. Each machine 12 may be controlled to perform a sequence of multiple cuts 36 in order along the length of an assigned slot 40 for a single shallow excavation pass. After one excavation pass along the length of two adjacent slots 40 is achieved, machine 12 may be directed by controller 30 to move to a location that overlaps the non-successive and adjacent slots 40 (i.e., to a location between the two previously-created slots 40) to remove a narrow line 48 of material left behind during prior dozing of the two slots 40. After excavation of all slots 40 and lines 48 to the desired depth is achieved, one phase of the excavation plan may be complete. Another phase of the same excavation plan may then require machine 12 to repeat the process to a new and lower depth.

The fourth dozing behavior, illustrated in FIG. 6, may include the pushing of material through only portions of spaced apart slots 40. For example, each machine 12 may be controlled to excavate a subset of cuts 36 within a particular slot 40, and carry material removed from the excavated cuts 36 over other cuts 36 of the same slot 40 before dumping the excavated material over edge 50. After completing the subset of cuts, machine 12 may move to another slot 40 and again complete only a subset of these slots. The fourth dozing behavior may result in a checkerboard-like appearance of area 44.

The fifth dozing behavior, illustrated in FIG. 7, may include the pushing of material through the same portions of spaced apart slots 40. That is, each machine 12 may be controlled to excavate particular transversely-aligned cuts 36 within multiple slot 40, before completing other cuts within the same slots 40. For example, each machine 12 may be controlled to only excavate the terminal cuts 36 at edge 50 of all slots 40 before returning to excavate cuts 36 adjacent the terminal cuts 36.

After laying out slots 40 on area 44 of worksite 10 according to operator-selected dozing behaviors, offboard planner 32 may be configured to design cuts 36 within slots 40. The number, shape, size, and location of cuts 36 may be determined based on the slot layout, site characteristics, machine characteristics, desired dozing behavior, and user-defined goals. The site characteristics considered by offboard planner 32 may include, among other things, a contour of surface 38 and a composition of material to be excavated from each slot 40. The machine characteristics considered by offboard planner 32 may include, among other things, a torque and/or speed capacity of machines 12 and a size of work tool 18 (e.g., a width and/or height). The user-defined goals considered by offboard planner 32 may include, among other things, a desired final depth of slot 40 and/or a resulting contour of area 44. Based on this information and utilizing one or more algorithms and/or maps stored in memory, offboard planner 32 may be configured to determine a number, size, and location of each individual cut 36 within slots 40 such that a sufficient amount of material may be removed by machines 12 during each pass and phase to achieve the user-defined depth and/or contour goals without negatively affecting productivity or efficiency of machine 12.

Cuts 36 may be generally arranged length-wise and end-to-end relative to each other with slots 40, and each include a start location 52 at which work tool 18 should penetrate work surface 38, an end location 54 at which work tool 18 should be extracted from work surface 38, a depth below work surface 38, and a cutting profile that are defined by offboard planner 32. In one embodiment, the start location 52 of one cut 36 may coincide with the end location 54 of an adjacent cut 36. In another embodiment, a space (not shown) may exist between cuts 36, if desired. In general, a lengthwise slope of cuts 36 should decline as steeply as possible in a push direction while still allowing machine 12 to reverse up a subsequently excavated area in a desired gear, for example in second gear. In the disclosed embodiment, an end cut 36 of each slot 40 should terminate at a push edge 50, such that as machine 12 reaches the end of slot 40, the material being pushed by machine 12 may tumble out of slot 40 and down a face of push edge 50. In the disclosed embodiment of FIG. 2, cuts 36 are arranged into three passes (i.e., three layers), each pass having the same depth. In addition, each cut 36 may have the same length, and have start and end locations 52, 54 coincident within the same pass, but staggered between passes. It is contemplated that other relationships may also be utilized.

Offboard planner 32 and/or controller 30 may be configured to generate a transition slope 60 at start and/or end locations 52, 54. Transition slope 60 may facilitate a smooth transition of work tool 18 between cuts 36, thereby reducing machine-damaging movements and the likelihood of machine 12 becoming stuck or delayed during operation. In one embodiment, transition slope 60 may be calculated by offboard planner 32 and communicated to controller 30 for implementation. In another embodiment, transition slope 60 may be calculated by controller 30 after receiving information regarding start and/or end locations 52, 54 from offboard planner 32. In either situation, transition slope 60 may be calculated based on a mathematical curve, the characteristics of worksite 10, and the characteristics of machine 12. For example, controller 30 may use a Gaussian curve, such that ends of transition slope 60 are generally tangent with adjacent surfaces.

After laying out slots 40 on area 44 of worksite 10, and determining the sizes and locations of cuts 36 within slots 40, offboard planner 32 may be configured to display the resulting excavation plan to the user of control system 16 and receive feedback regarding the plan. The excavation plan may be presented in the form of an electronic 2-D or 3-D map displayed on a monitor within business entity 34 (referring to FIG. 1). At this point in time, the user may be able to make modifications to the excavation plan. The modifications may include, for example, a location, a length, a trajectory, a number, a spacing, a depth, and/or a profile of individual cuts 36, slots 40, and/or passes.

After receiving input from the user of control system 16 regarding modifications to the excavation plan, offboard planner 32 may be configured to generate travel routes for each machine 12 required to complete the excavation plan. The travel routes may include a machine travel path that encompasses one or more sequences of cuts 36, arrangement of the sequences into passes and phases, and corresponding tool trajectories during each of cuts 36. Offboard planner 32 may then communicate the travel routes to individual machines 12 and coordinate execution of the travel routes by the different machines 12.

The travel routes from offboard planner 32 may be used by machines 12 to autonomously alter the geography of worksite 10. In particular, controller 30 of each machine 12 may autonomously control operations of machine 12 to engage work tool 18 with the terrain of worksite 10 at the recommended excavation entry and exit points. Controller 30 may be in communication with actuators 20 and/or traction devices 22 to raise, lower, and/or orient machine 12 and work tool 18 such that work tool 18 penetrates and is extracted from the terrain of worksite 10 in a desired manner. For example, controller 30 may communicate with power source 24, with various hydraulic control valves and/or electronic switches associated with actuators 20, with transmission devices, and other actuation components of machine 12 to initiate, modify, or halt operations of actuators 20 and traction devices 22, as necessary or desired. It is contemplated that controller 30 may use locating device 26, position sensor 28, and/or other such guidance and implement positioning systems to accurately control the operation of machine 12 such that work tool 18 penetrates the terrain of worksite 10 at the recommended excavation entry point or start location 52 and is extracted at the recommended exit point or end location 54. Alternatively, the travel routes for machine 12 may be displayed within an operator station of machine 12 for manual completion of the excavation process, if desired. In this manner, controller 30 may provide for partial or full automatic control of machine 12.

During operation of machines 12 along the different travel routes assigned by offboard planner 32, it may be possible for actual machine performance to deviate somewhat from an expected machine performance. For example, it may be possible for work tool 18 to penetrate the terrain of worksite 10 at a location different from start location 52 and/or for work tool 18 to be extracted from the terrain of worksite 10 a location different from end location 54. In another example, it may be possible for the intended depth of a particular cut 36 to be too deep for a particular machine such that, when machine 12 attempts the planned cut 36, machine 12 lugs unacceptably. In yet another example, it may be possible for machine 12 to move an amount of material different than intended (i.e., more or less material). Other deviations are also contemplated. In these situations, controller 30 may be configured make on-the-fly adjustments to the operation of machine 12 to reduce the magnitude of the deviations. For example, when controller 30 determines that the actual movement of work tool 18 results in a distance deviation from a desired start or end location 52, 54, controller 30 may be configured to calculate and implement a tool trajectory offset that accounts for the deviation. Similarly, when controller 30 recognizes that machine 12 is lugging or about to lug unacceptably, controller 30 may be able to adjust the working depth of work tool 18 (i.e., raise work tool 18) to reduce a load on machine 12. Further, when controller 30 recognizes that too little or too much material has been moved by machine 12 during a particular cut 36, controller 30 may make adjustments as to a length and/or depth of ensuing cuts 36. Other adjustments are also considered.

Offboard planner 32 may be configured to modify the excavation plan and/or individual travel routes based on the deviations described above and/or based on the adjustments that controller 30 makes in response to the deviations. For example, offboard planner 32 may change the coordinates of start and/or end locations 52, 54, change a desired depth of each pass, and/or make other similar changes. In this manner, it may be more likely that machine 12 will be able to follow the assigned travel route.

Controller 30 may also be configured to automatically detect the location of push edge 50 during excavation. Because machines 12 may be unmanned, it may be critical that controller 30 accurately determine the end of slot 40 (i.e., the location of push edge 50) and control machine 12 accordingly. Controller 30 may be configured to monitor one or more performance parameters of machine 12 such as travel speed, engine torque, work tool forces, actuator pressures, etc., and based on changes in the monitored parameters, determine that machine 12 has reached an end of a particular slot 40. For example, when pushing a mound of material toward push edge 50, the mound of material will eventually reach a location at which some of the material begins to fall over push edge 50. When some of the material falls over push edge 50, the resistance to movement of machine 12 will lessen and, accordingly, the engine speed of power source 24 and/or the travel speed of machine 12 may increase. Similarly, at this same time, the force on work tool 18 and/or the pressures within actuators 20 may reduce. In another example, a portion of a mound of material from a previous push may be left at push edge 50. During a subsequent push by machine 12 toward push edge 50, the mound of material currently being pushed will eventually engage the mount of material from the previous push. At this point in time, the performance parameters may similarly change by a threshold amount indicative of machine 12 reaching push edge 50. In either situation, when the resistance to movement of machine 12 changes (i.e., increases or decreases) by at least a threshold amount, as exhibited in the monitored performance parameters, controller 30 may determine that machine 12 has reached push edge 50 and respond accordingly.

INDUSTRIAL APPLICABILITY

The disclosed control system may be applicable to machines performing material moving operations where productivity and efficiency is important. Although applicable to any type of machine, the disclosed control system may be particularly applicable to autonomously controlled dozing machines where the dozing machines are autonomously controlled to follow particular travel routes. The disclosed control system may determine an excavation plan for an entire worksite area, determine individual cuts, sequences of cuts, passes through each sequence, and phases of excavation required to accomplish a user-defined goal. Based on the excavation plan, the control system may then determine travel routes for individual machines operating at the worksite.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for a mobile excavation machine operating at a worksite, the control system comprising:
   a locating device mounted on the mobile excavation machine and configured to generate a first signal indicative of a position of the mobile excavation machine at the worksite;
   a position sensor associated with a work tool of the mobile excavation machine and configured to generate a second signal indicative of a position of the work tool relative to a known location on the mobile excavation machine;
   an offboard planner configured to:
      receive a first input indicative of a characteristic of an intended work area;
      receive a second input indicative of a characteristic of the mobile excavation machine;
      receive a third input indicative of a desired change in the intended work area; and
      generate an excavation plan for the intended work area based on the first, second, and third inputs; and
   a controller in communication with the locating device, the position sensor, and the offboard planner, the controller configured to autonomously control the mobile excavation machine based on the first and second signals and based on the excavation plan.

2. The control system of claim 1, wherein the characteristic of the intended work area includes at least one of a current boundary and a site profile of the intended work area.

3. The control system of claim 1, wherein the characteristic of the mobile excavation machine includes at least one of a work tool dimension, a work tool shape, and a machine capacity.

4. The control system of claim 1, wherein the excavation plan includes a plurality of cuts into the intended work area grouped together at a plurality of spaced apart locations, the plurality of cuts each having at least one of a defined start location, end location, depth, and cutting profile.

5. The control system of claim 4, wherein the excavation plan includes a transition slope between the plurality of cuts within a single group.

6. The control system of claim 4, wherein each of the plurality of cuts includes an associated travel path plan for the mobile excavation machine and an associated trajectory plan for the work tool.

7. The control system of claim 6, wherein the excavation plan includes a sequence of the plurality of cuts.

8. The control system of claim 7, wherein the excavation plan includes multiple phases each having at least one sequence of the plurality of cuts.

9. The control system of claim 8, wherein the offboard planner is further configured to:
   display the excavation plan; and
   receive modifications to the excavation plan from a user.

10. The control system of claim 9, wherein the modifications include at least one of a location, a length, a trajectory, a number, a spacing, and a depth of the plurality of cuts.

11. The control system of claim 8, wherein the offboard planner is further configured to:
   receive a selection from a user of a plurality of available excavation behaviors; and
   at least one of the sequence of the plurality of cuts and the multiple phases is generated based on the selection.

12. The control system of claim 11, wherein the plurality of excavation behaviors includes a first behavior, where:
   the plurality of cuts are arranged lengthwise into a plurality of slots spaced apart from each other by a berm;
   the at least one sequence includes completion of all cuts within a single slot before movement to another of the plurality of slots; and
   the cuts within the single slot are completed in order along a length of the single slot.

13. The control system of claim 12, wherein the plurality of excavation behaviors includes a second behavior, where:
   the plurality of cuts are arranged lengthwise into a plurality of slots, at least one of which at least partially overlap with another slot that was excavated immediately prior to the at least one slot; and
   the at least one sequence including completion of all cuts within a single slot before movement to another of the plurality of slots.

14. The control system of claim 13, wherein the plurality of excavation behaviors includes a third behavior, where:
   the plurality of cuts are arranged lengthwise into a plurality of slots, at least one of which at least partially overlaps with two other previously excavated slots; and
   the at least one sequence including completion of all cuts within the two other previously excavated slots before movement to the at least one slot that at least partially overlaps the two other previously excavated slots.

15. The control system of claim 14, wherein the plurality of excavation behaviors includes a fourth behavior, where:
   the plurality of cuts are arranged lengthwise into a plurality of slots; and
   the at least one sequence including completion of particular spaced apart cuts within each of the plurality of slots before completion of all cuts within any one of the plurality of slots.

16. The control system of claim 15, wherein the plurality of excavation behaviors includes a fifth behavior, where the plurality of cuts are arranged lengthwise into a plurality of slots, the at least one sequence including completion of transversely aligned cuts of the plurality of slots before completion of all cuts within any one of the plurality of slots.

17. The control system of claim 16, wherein the plurality of cuts of the at least one sequence of a particular one of the multiple phases are arranged in layers within each of the plurality of slots, at least one of the number of layers and a resulting depth within each of the plurality of slots being adjustable by a user.

18. The control system of claim 6, wherein the controller is further configured to:
   monitor performance of the mobile excavation machine during completion of the excavation plan; and
   autonomously adjust an actual trajectory away from the trajectory plan for the work tool based on the output.

19. The control system of claim 18, wherein the performance is an engine speed.

20. The control system of claim 19, wherein the controller is configured to autonomously raise the work tool when the engine speed falls below a threshold speed.

21. The control system of claim 18, wherein the performance is an amount of material moved by the mobile excavation machine.

22. The control system of claim 18, wherein the performance is at least one of a work tool penetration and extraction location relative to a planned penetration and extraction location.

23. The control system of claim 18, wherein the offboard planner is further configured to modify the excavation plan based on adjustments made to the actual trajectory of the work tool.

24. The control system of claim 6, wherein the controller is further configured to:
   detect a resistance to movement of the mobile excavation machine during completion of the excavation plan; and
   determine that the mobile excavation machine has reached a travel path end for the mobile excavation machine based on a change in the resistance.

25. The control system of claim 24, wherein, when the resistance reduces by at least a threshold amount, the controller is configured to determine that the mobile excavation machine has reached a dump edge at the travel path end.

26. The control system of claim 24, wherein, when the resistance increases by at least a threshold amount, the controller is configured to determine that the mobile excavation machine has reached a dump pile located at the travel path end.

27. The control system of claim 1, wherein the offboard planner is configured to generate an excavation plan for a plurality of mobile excavation machines simultaneously operating at the worksite.

28. A computer readable medium having computer executable instructions for performing a method of excavation planning and control, the method comprising:
   determining a first position of a mobile machine at a worksite;
   determining a second position of a work tool relative to the mobile machine;
   receiving a first input indicative of a characteristic of an intended work area;
   receiving a second input indicative of a characteristic of the mobile machine;
   receiving a third input indicative of a desired change in the intended work area;
   generating an excavation plan for the intended work area based on the first, second, and third inputs; and
   autonomously controlling the mobile machine based on the first and second positions and based on the excavation plan.

29. The computer readable medium of claim 28, wherein the characteristic of the intended work area includes at least one of a current boundary and a site profile of the intended work area.

30. The computer readable medium of claim 28, wherein the characteristic of the mobile excavation machine includes at least one of a work tool dimension, a work tool shape, and a machine capacity.

31. The computer readable medium of claim 28, wherein the excavation plan includes a plurality of cuts into the intended work area grouped together at a plurality of spaced apart locations, the plurality of cuts each having at least one of a defined start location, end location, depth, and cutting profile.

32. The computer readable medium of claim 31, wherein the excavation plan includes a transition slope between the plurality of cuts within a single group.

33. The computer readable medium of claim 31, wherein each of the plurality of cuts includes an associated travel path plan for the mobile machine and an associated trajectory plan for the work tool.

34. The computer readable medium of claim 31, wherein the excavation plan includes a sequence of the plurality of cuts.

35. The computer readable medium of claim 34, wherein the excavation plan includes multiple phases each having at least one sequence of the plurality of cuts.

36. The computer readable medium of claim 35, wherein the method further includes:
   displaying the excavation plan; and
   receiving modifications to the excavation plan from a user.

37. The computer readable medium of claim 36, wherein the modifications include at least one of a location, a length, a trajectory, a number, a spacing, and a depth of the plurality of cuts.

38. The computer readable medium of claim 37, wherein:
   the method further includes receiving a selection from a user of a plurality of available excavation behaviors; and
   at least one of the sequence of the plurality of cuts and the multiple phases is generated based on the selection.

39. The computer readable medium of claim 38, wherein the plurality of excavation behaviors includes a first behavior, where:
   the plurality of cuts are arranged lengthwise into a plurality of slots spaced apart from each other by a berm;
   the at least one sequence includes completion of all cuts within a single slot before movement to another of the plurality of slots; and
   the cuts within the single slot are completed in order along a length of the single slot.

40. The computer readable medium of claim 39, wherein the plurality of excavation behaviors includes a second behavior, where:
   the plurality of cuts are arranged lengthwise into a plurality of slots, at least one of which at least partially overlaps with another slot that was excavated immediately prior to the at least one slot; and
   the at least one sequence including completion of all cuts within a single slot before movement to another of the plurality of slots.

41. The computer readable medium of claim 40, wherein the plurality of excavation behaviors includes a third behavior, where:
   the plurality of cuts are arranged lengthwise into a plurality of slots, at least one of which at least partially overlaps with two other previously excavated slots; and
   the at least one sequence including completion of all cuts within the two other previously excavated slots before movement to the at least one slot that at least partially overlaps the two other previously excavated slots.

42. The computer readable medium of claim 41, wherein the plurality of excavation behaviors includes a fourth behavior, where:
   the plurality of cuts are arranged lengthwise into a plurality of slots; and
   the at least one sequence including completion of particular spaced apart cuts within each of the plurality of slots before completion of all cuts within any one of the plurality of slots.

43. The computer readable medium of claim 42, wherein the plurality of excavation behaviors includes a fifth behavior, where the plurality of cuts are arranged lengthwise into a plurality of slots, the at least one sequence including completion of transversely aligned cuts of the plurality of slots before completion of all cuts within any one of the plurality of slots.

44. The computer readable medium of claim 43, wherein the plurality of cuts of the at least one sequence of a particular one of the multiple phases are arranged in layers within each of the plurality of slots, at least one of the number of layers and a resulting depth within each of the plurality of slots being adjustable by a user.

45. The computer readable medium of claim 33, wherein the method further includes:
- monitoring performance of the mobile machine during completion of the excavation plan; and
- selectively adjusting an actual trajectory away from the trajectory plan for the work tool based on the output.

46. The computer readable medium of claim 45, wherein the performance is an engine speed.

47. The computer readable medium of claim 46, wherein the method includes raising the work tool when the engine speed falls below a threshold speed.

48. The control system of claim 45, wherein the performance is an amount of material moved by the mobile machine.

49. The computer readable medium of claim 45, wherein the performance is at least one of a work tool penetration and extraction location relative to a planned penetration and extraction location.

50. The computer readable medium of claim 45, wherein the method further includes modifying the excavation plan based on adjustments made to the actual trajectory of the work tool.

51. The computer readable medium of claim 33, wherein the method further includes:
- detecting a resistance to movement of the mobile machine during completion of the excavation plan; and
- determining that the mobile machine has reached a travel path end for the mobile machine based on a change in the resistance.

52. The computer readable medium of claim 51, wherein, when the resistance reduces by at least a threshold amount, the method includes determining that the mobile machine has reached a dump edge at the travel path end.

* * * * *